US006460830B1

(12) United States Patent
Boulant

(10) Patent No.: US 6,460,830 B1
(45) Date of Patent: Oct. 8, 2002

(54) DEVICE FOR STIRRING AND AERATING A LIQUID AND ELIMINATING FOAM IN A TANK FOR TREATING SAID LIQUID

(75) Inventor: Alain Boulant, Joue/Erdre (FR)

(73) Assignee: Carbofil International, Saint Mars la Jaille (FR)

( * ) Notice: Subject to any disclaimer, the term of this patent is extended or adjusted under 35 U.S.C. 154(b) by 7 days.

(21) Appl. No.: 09/704,737

(22) Filed: Nov. 3, 2000

Related U.S. Application Data

(63) Continuation-in-part of application No. 09/348,315, filed on Jul. 7, 1999, now abandoned, which is a continuation-in-part of application No. PCT/FR97/02463, filed on Dec. 30, 1997.

(30) Foreign Application Priority Data

Jan. 8, 1997 (FR) ............................................ 97 00116

(51) Int. Cl.7 .................................................. B01F 3/04
(52) U.S. Cl. ......................... 261/36.1; 261/58; 261/91; 261/93; 261/123
(58) Field of Search ........................... 261/36.1, 49, 58, 261/67, 84, 91, 93, 123, 121.1

(56) References Cited

U.S. PATENT DOCUMENTS

| | | | | |
|---|---|---|---|---|
| 2,244,902 A | * | 6/1941 | Stich ............................ | 261/93 |
| 4,328,175 A | | 5/1982 | Roeckel et al. | |
| 4,374,030 A | * | 2/1983 | Franklin, Jr. ................. | 261/93 |
| 4,699,740 A | * | 10/1987 | Bollenrath ..................... | 261/93 |
| 4,919,849 A | * | 4/1990 | Litz et al. ...................... | 261/93 |
| 5,925,290 A | * | 7/1999 | Hills ............................. | 261/93 |
| 5,972,661 A | * | 10/1999 | Kubera et al. ................. | 261/93 |

FOREIGN PATENT DOCUMENTS

| | | | | |
|---|---|---|---|---|
| DE | 2408794 | | 9/1975 | |
| DE | 3000395 A1 | * | 7/1981 | ................. 261/93 |
| DE | 3427174 | | 2/1985 | |
| DE | 9302204 | * | 8/1993 | |
| EP | 0264905 A1 | * | 4/1988 | |
| EP | 0687497 A1 | * | 12/1995 | |

OTHER PUBLICATIONS

French Search Report dated Jul. 22, 1997.

* cited by examiner

Primary Examiner—C. Scott Bushey
(74) Attorney, Agent, or Firm—Stevens, Davis, Miller & Mosher, LLP

(57) ABSTRACT

The device includes a vertical sheath (11) extending in a part of the height of the tank (1), a funnel (14) located around the upper part of the sheath (11), a vertical shaft (19) driving the propeller (20) in rotation, anti-vortex blades (24) located inside the sheath (11), below the propeller (20), a pipe (33) for injecting a gas under pressure in the sheath (11), below the anti-vortex blades (24), and uniquely static stirring obstacles (31, 32) for stirring the liquid (3) by turbulence inside the sheath (11), these obstacles being located below the anti-vortex blades (24). The invention is applicable for example to the treatment of fatty waste products extracted from town sewage effluents or agricultural food industries.

34 Claims, 12 Drawing Sheets

DEVICE FOR STIRRING AND AERATING A LIQUID AND ELIMINATING FOAM IN A TANK FOR TREATING SAID LIQUID

This application is a continuation-in-part of U.S. application Ser. No. 09/348,315, filed in Jul. 7,1999, now abandoned which itself is a continuation-in-part of international PCT application PCT/FR97/02463, filed Dec. 30,1997 under priority of the French patent application 97/00116, filed Jan. 8,1997.

FIELD OF THE INVENTION

The present invention relates to a device for stirring and aerating a liquid and eliminating foam in a tank or vat treating this liquid, such as for example fatty waste products extracted from effluents of town sewage or agricultural food industries.

BACKGROUND OF THE INVENTION

As is known, the town sewage effluents which circulate in discharging pipes such as drains are collected in purification stations in which various treating operations are carried out to purify them before returning them to the natural medium.

This purification produces by-products related to the purification such as fats, sludges.

Dumping sites are less and less inclined to accept this type of products so that the purification stations must now be capable of treating them and limiting them as far as possible.

Thus, the fats trapped at the inlet of the purification station are poured into a treating apparatus such as for example a biological decomposition tank which comprises a mechanical stirrer for stirring the liquid.

It is known from European patent application No. 0 687 497 that such a decomposition tank may be of the type comprising:

- a vertical sheath extending in a part of the height of the tank and comprising, in its upper part, at least a first opening providing an entry passage for the liquid and, near the bottom of this tank, at least a second opening providing an exit passage for the liquid,
- a funnel located around the upper part of the sheath and connected to said sheath, the upper edge of said funnel defining with the wall of the tank a free space for the passage of the liquid,
- a main propeller located inside the sheath below the bottom of the funnel,
- a vertical shaft driven in rotation, extending inside the sheath above this propeller and driving the latter in rotation,
- an anti-vortex means located inside the sheath, below said propeller,
- means for injecting a gas under pressure in the sheath, below the antivortex means, and
- dynamic stirring means for stirring the liquid inside the sheath, these means being located below the anti-vortex means.

In this prior art apparatus, said dynamic stirring means comprise a prolonged section of said shaft which extends from said propeller down to a bearing which is fastened to the bottom of the tank.

Rods are fastened along said section of the shaft so as to stir dynamically the liquid which is located inside the sheath when the shaft rotates.

For mechanical reasons, which are partly due to the fact that the shaft has a tendency to vibrate, the latter cannot be very long. A length of about 15 feet is typical. Thereby, the depth of the tank is also typically limited to about 15 feet.

This restriction is too bad, since the efficiency of such an apparatus increases with the depth of the tank. In fact, due to the law of Henry, the deeper the thank, the greater the solubility of the gas which is introduced under pressure in the sheath, and thereby the greater the biological activity inside the liquid and the faster the decomposition of the products comprised in this liquid.

Moreover, due to the friction which is exerted by the liquid on the rods, the power transmitted by the driving means to the shaft has to be very important.

Further, stringy materials frequently get tangled with the rods, thereby reducing the efficiency of the stirring. One must then stop the apparatus and pull the shaft out of the tank in order to remove the stringy materials.

Besides, after a certain time of use, one also has to replace the bearing located at the bottom of the tank and/or the shaft. For doing so, the whole apparatus has to be stopped and the tank has to be emptied, which is both complicated and time consuming.

It is therefore an object of the present invention to avoid these drawbacks by proposing a device for stirring and aerating a liquid, such as for example fatty waste products extracted from town sewage effluents or agricultural food industries, which can be used in very deep tanks, which consumes less energy than the aforesaid apparatus, which remains efficient despite the presence of stringy materials, and which requires very little maintenance.

Further, in the course of the treatment of the liquid, such as for example fatty waste products, there is formed on the surface of the liquid a layer of foam which tends to fly away and to pollute the environment.

It is therefore necessary to provide means for eliminating this foam floating on the surface of the liquid in the course of the treatment of the latter.

Up to the present time, these means have been formed by stirrers located at the level of the surface of the liquid and adapted to flatten the foam.

Yet, these stirrers are not entirely satisfactory and a part of the foam flies away and pollutes the environment.

It is therefore an other object of the present invention to provide more efficient means for recovering the foam floating on the surface of the liquid.

SUMMARY OF THE INVENTION

The first aforesaid object is reached with a device for stirring and aerating a liquid in a tank for treating said liquid, comprising inside said tank:

- a vertical sheath extending in a part of the height of said tank and comprising, in its upper part, at least a first opening providing an entry passage for said liquid and, near the bottom of said tank, at least a second opening providing an exit passage for said liquid,
- a funnel located around the upper part of said sheath and connected to said sheath, the upper edge of said funnel defining with a wall of said tank a free space for the passage of the liquid,
- a main propeller located inside said sheath below the bottom of said funnel,
- a vertical shaft driven in rotation, extending inside said sheath above said propeller and driving the latter in rotation,
- an anti-vortex means located inside said sheath, below said propeller,
- means for injecting a gas under pressure in said sheath, below said anti-vortex means, and uniquely static stirring means for stirring said liquid by turbulence inside said sheath, said static stirring means being located below said antivortex means.

The second aforesaid object is reached with means for eliminating foam in said tank, comprising:
- a first series of ports provided in the upper part of said sheath and located at the level of said liquid in said funnel,
- a second series of ports provided in said sheath, above the bottom of said funnel, and
- means for regulating the level of said liquid in said funnel.

Further features and advantages of the invention will be apparent in the course of the following description with reference to the accompanying drawings.

DESCRIPTION OF THE DRAWINGS

In the drawings:

FIG. 4 is a sectional view taken on line 4—4 of FIG. 3a.

DETAILED DESCRIPTION

Figure 1:
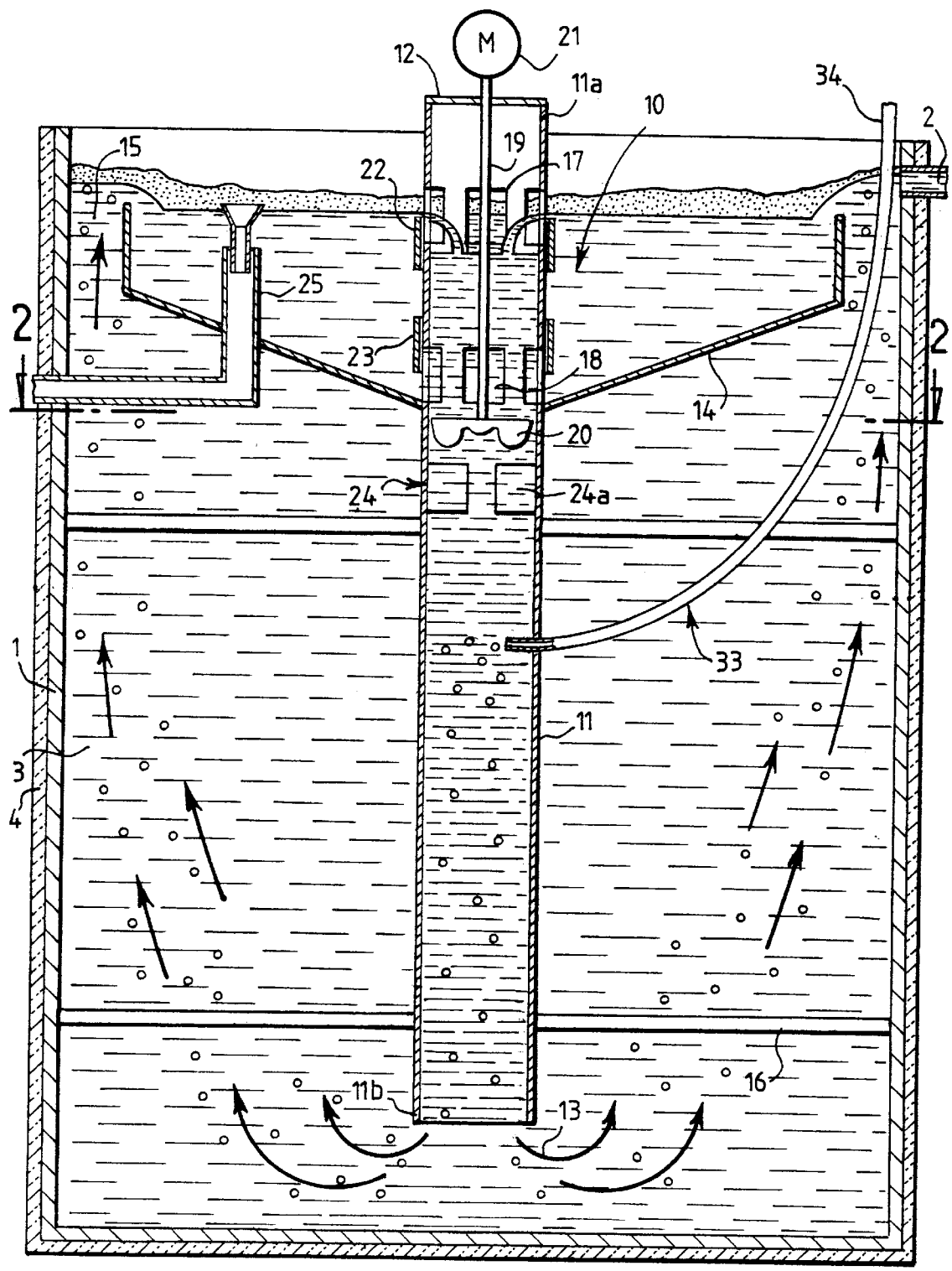
FIG. 1 is a diagrammatic sectional view of a tank for treating a liquid provided with a first embodiment of a device for stirring and aerating said liquid according to the invention.
Figure 3A:
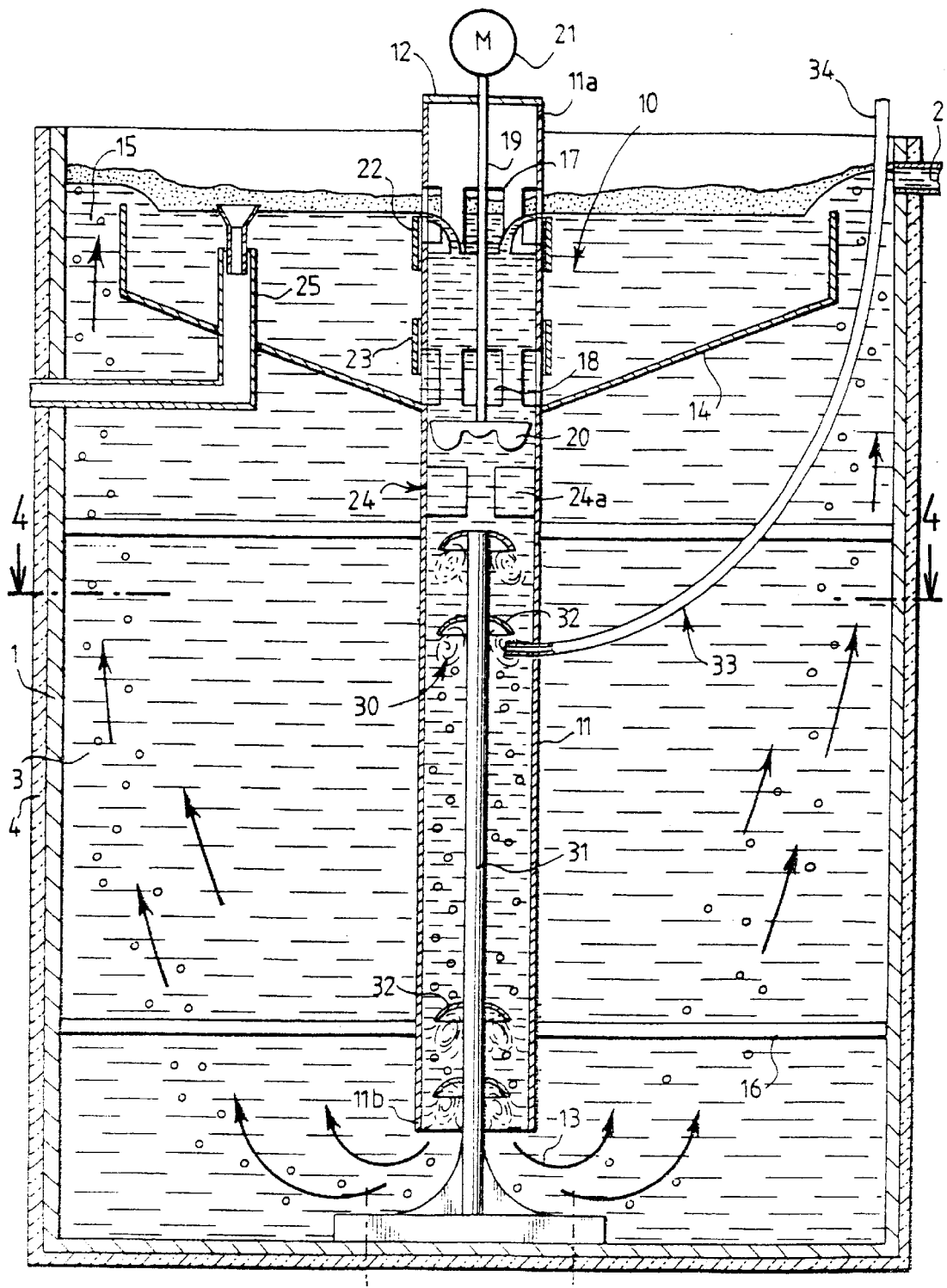
FIG. 3a is a diagrammatic sectional view of a tank for treating a liquid provided with a second embodiment of a device for stirring and aerating said liquid according to the invention.
Figure 3B:
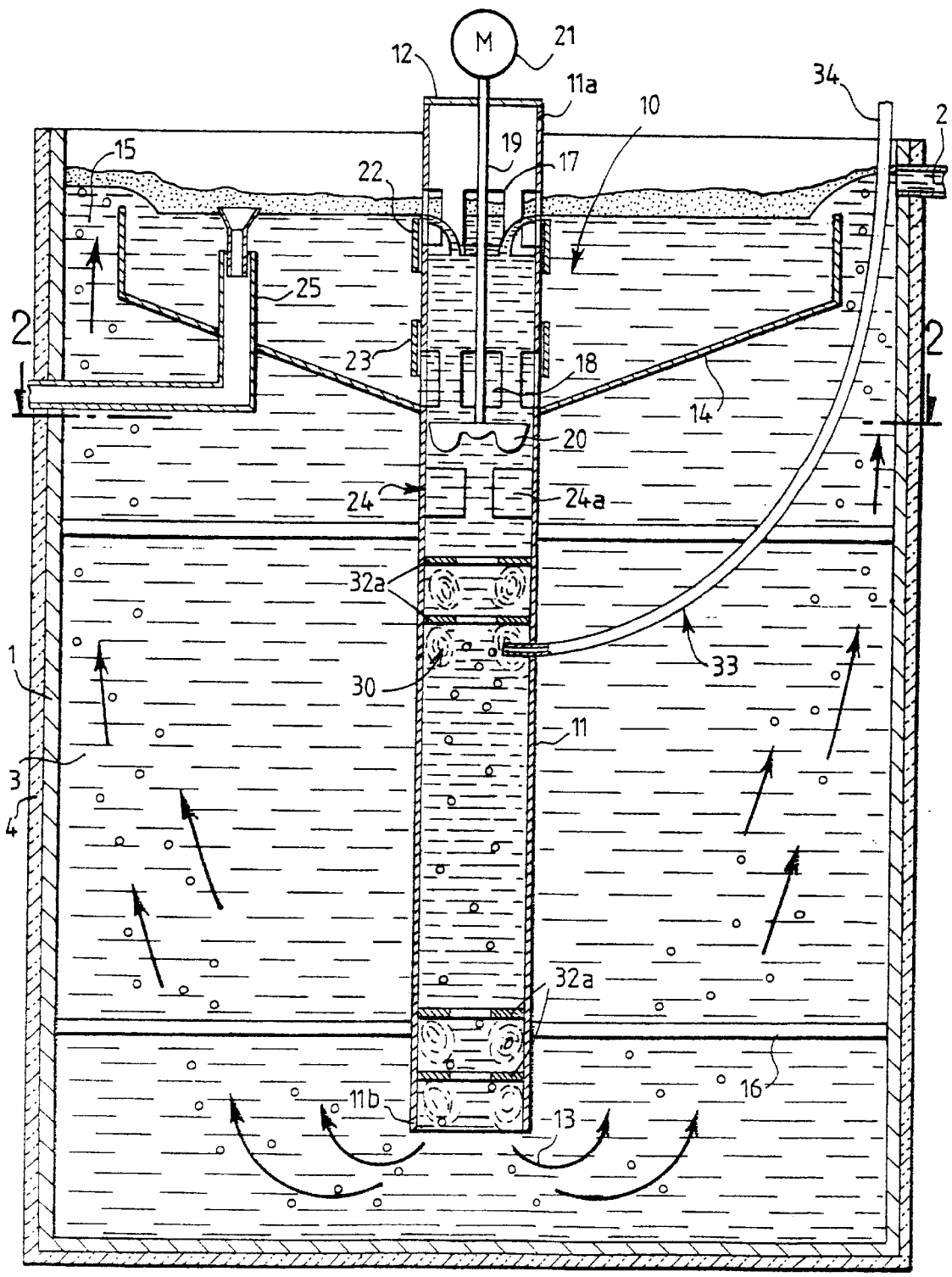
FIG. 3b is a view similar to FIG. 3a showing a variant of static stirring means.

Shown in FIGS. 1, 3a and 3b is a tank or vat 1 provided in its upper part with an inlet 2 for a liquid 3 to be treated, such as for example fatty effluents extracted from town sewage effluents.

The treating tank 1 is covered on its outer side with an insulation 4 and comprises a device, designated by the general reference numeral 10, for stirring and aerating the liquid 3 and eliminating the foam.

The device 10 according to the invention, located inside the tank 1, comprises a vertical sheath 11 extending in a part of the height in the tank 1.

The upper end 11a of the sheath 11 is closed by a plate 12 and the lower end of the sheath 11 is open and defines with the bottom of the tank 1 a passage 13 for the liquid 3.

The device 10 further comprises an upwardly divergent funnel 14 whose upper edge defines with the wall of the tank 1 a free space 15 for the passage of the liquid 3 and whose lower edge is connected to the sheath 11 at a certain distance from the upper end of the sheath 11.

The assembly comprising the sheath 11 and the funnel 14 is fixed inside the tank 1 by suitable means, such as for example struts 16 which define therebetween passages for the liquid 3.

The sheath 11 comprises a first series of ports 17 evenly spaced apart on the periphery of the sheath 11 and located at the level of the liquid in the funnel 14.

This sheath 11 is further provided with a second series of ports 18 evenly spaced apart on the periphery of the sheath 11 and located above the bottom of the funnel.

The device 10 is also provided with means for sucking the liquid and the foam inside the sheath 11 through the ports 17 and 18 which are formed by a vertical shaft 19 located inside the sheath 11 and extending from the upper end of the sheath 11 to the bottom of the funnel 14 and by a main propeller or screw 20 fixed on the free end of the shaft 19 below the bottom of the funnel 14.

The diameter of the main propeller 20 is slightly less than the inside diameter of the sheath 11.

The shaft 19 and the propeller 20 are driven in rotation by a motorspeed reducer unit 21 which is fixed to the plate 12 closing the upper end of the sheath 11.

The device 10 is provided with means for regulating the flow of the liquid and of the foam sucked by the main propeller 20 inside the sheath 11 through the ports 17 and 18.

These regulating means comprise, on one hand, a first sleeve 22 located around the sheath 11 at the level of the first series of ports 17 and, on the other hand, a second sleeve 23 located around the sheath 11 at the level of the second series of ports 18.

The position of each sleeve 22 and 23 relative to the ports 17 and 18 respectively is vertically adjustable by suitable clamping means (not shown).

An anti-vortex means 24 is located inside the sheath 11 below the propeller 20 to prevent rotation of the liquid 3 in the sheath 11.

Figure 2:
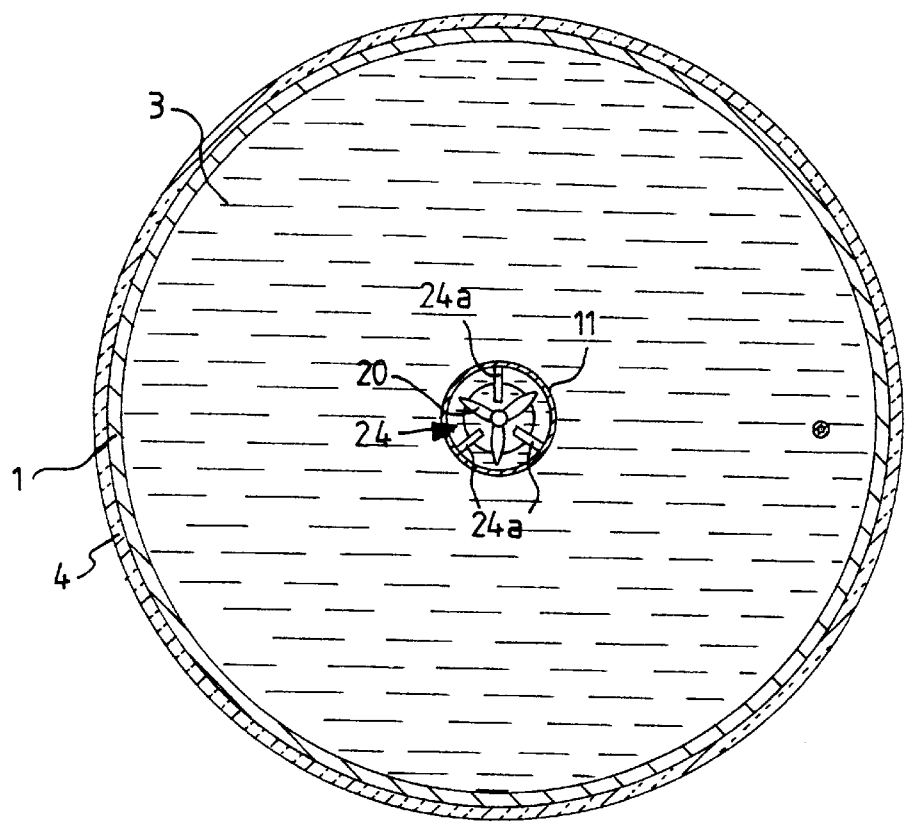
FIG. 2 is a sectional view taken on line 2—2 of FIG. 1.

As shown in FIG. 2, this anti-vortex means 24 is formed by three vertical plates 24a spaced 120° apart inside the sheath 11.

The device 10 is also provided with means for regulating the level of the liquid 3 in the funnel 14 which comprise an overflow pipe 25 located inside the funnel 14 in a vertically adjustable position.

In the first embodiment of FIG. 1, the inner wall of the portion of the sheath 11 extending from some distance above the bottom of the tank 1 to below the anti-vortex means 24 constitutes static stirring means which, through interaction with the flow of liquid generated downward in the sheath 11 by the main propeller 20, create turbulences in the liquid to be treated.

In a second embodiment shown in FIG. 3a, the device 10 comprises supplementary means 30 located below the anti-vortex means 24 for effecting a static stirring by turbulence of the liquid 3 inside the sheath 11.

Figure 4:
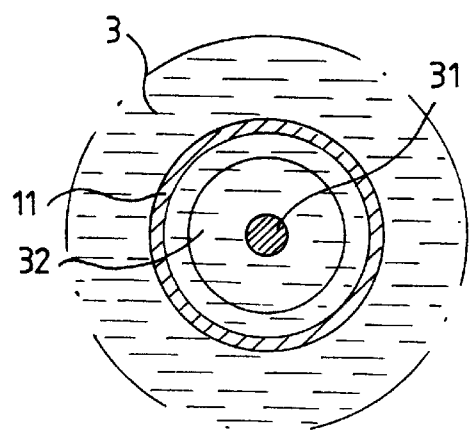

As shown in FIGS. 3a and 4 the supplementary means 30 for the static stirring by turbulence of the liquid 3 comprise, on one hand, a vertical tube 31 located inside the sheath 11 and extending from the bottom of the tank 1 to below the anti-vortex means 24 and, on the other hand, superimposed static obstacles 32 located inside the sheath 11 and fixed on the tube 31. The tube 31 is fixed to the bottom of the tank 1 by suitable means.

The static obstacles 32 define with the inner wall of the sheath 11 passages for the circulation of the liquid.

As shown in FIG. 3a, the static obstacles 32 are arranged along the tube 31, on one hand, below the anti-vortex means 24 and, on the other hand, in the lower part of the sheath 11. For example, the tube 31 comprises in its upper part below the anti-vortex means 24 two superimposed static obstacles 32 and in the lower part of the sheath 11 also two superimposed static obstacles 32.

In a variant, the static obstacles 32 may be evenly spaced apart throughout the portion of the tube 31 located in the sheath 11.

In the embodiment shown in FIG. 3a, the static obstacles 32 are formed by cups which concavity faces toward the bottom of the tank 1.

In a variant, the static obstacles 32 may be formed by discs.

In an other variant shown in FIG. 3b, the static stirring means 30 with the turbulence effect are formed by static obstacles 32a fixed to the inner wall of the sheath 11 and defining an axial passage for the circulation of the liquid 3.

These static obstacles 32a may be evenly spaced apart throughout the portion of the sheath 11 below the anti-vortex means 24 or, as shown on FIG. 3b, arranged on one hand below the anti-vortex means 24 and, on the other hand, in the lower part of the sheath 11.

In this case also, the static obstacles 32a are formed for example by cups the concavity of which faces toward the bottom of tank 1 or by discs as shown on FIG. 3b.

Further, the device 10 of FIGS. 1, 3a and 3b comprises means 33 for injecting a gas under pressure, such as for example air, into the sheath 11.

These injecting means 33 are formed by at least one pipe 34 which enters into the sheath 11 for example at a level located below the static elements 32 located in the upper part of the tube 31.

The device described operates in the following manner.

The liquid 3 to be treated is poured through the inlet 2 into the tank 1 up to a level above the upper edge of the funnel 14.

This liquid 3 is also poured into the funnel 14.

The motor-speed reducer unit 21 drives the shaft 19 in rotation which drives the main propeller 20 in rotation.

Simultaneously, the gas under pressure is injected into the sheath 11 through the pipes 34.

The rotation of the main propeller 20 causes the suction of the liquid 3 into the sheath 11 through the ports 17 and 18 so that this liquid 3 continuously circulates from the top to the bottom in the sheath 11, then passes through the space 13 and circulates from the bottom to the top between the sheath 11 and the inner wall of the tank 1, and so on.

The anti-vortex means 24 prevents the rotation of the liquid in the sheath 11 below the propeller 20.

The level of the liquid 3 in the funnel 14 is below the level of the liquid in the tank 1 and this level of the liquid in the funnel 14 is regulated by the overflow pipe 25 so that it is substantially midway of the height of the ports 17.

Further, owing to the suction created by the propeller inside the sheath 11, the level of the liquid in the sheath 11 is below the level of the liquid in the funnel 14.

The air driven inside the sheath 11 by the rotation of the propeller 20 and the gas under pressure injected into the sheath 11 create gas bubbles which are dispersed in the liquid 3 in the sheath 11 under the effect of the rotation of the propeller 20.

During the circulation of the liquid 3 in the sheath 11, the static stirring means (inner wall of sheath 11 in FIG. 1; inner wall of sheath 11 + static obstacles 32 or 32a in FIG. 3a or 3b) create turbulences which promote the stirring and the aeration of the liquid 3. This stirring effect is improved in the embodiments of FIG. 3a and 3b by the static obstacles 32 and 32a respectively which create turbulences below each of the latter.

In this way, the liquid 3 is stirred and the gas bubbles are divided into micro-bubbles promoting the dispersion of the gas and consequently the aeration of the liquid 3.

Surprisingly enough, the stirring operated by the static obstacles 32 or 32a has proved to be at least as efficient as the dynamic stirring previously used in prior art apparatuses, even in the case of deep tanks (e.g. in the case of 30 feet deep tanks, typically).

Since the shaft 19 doesn't extend below the propeller 20, the mechanical problems due to an excessive length of the shaft in prior art apparatuses do not exist any longer with the present device.

Thanks to the obstacles 32, or 32a being static, no energy is required from the motor-speed reducer unit 21 to stir the liquid 3 inside the sheath below the anti-vortex means 24. Thereby, the present device has an overall energy consumption which is much lower than the apparatuses of the prior art.

Further, the static character of the obstacles 32, or 32a prevents stringy materials to get tangled inside the sheath 11. Thereby, there is no need to stop the present apparatus to remove such materials from inside the sheath 11.

Moreover, since there is no shaft extending down to a bearing at the bottom of the tank 1, there is no need to control and to replace these parts.

Thereby, the present device practically never has to be stopped and emptied for maintenance operations.

Besides, should the present device be taken away from the tank 1 for any particular reason, this operation would be made very easy by the fact that the shaft 19 is relatively short.

Between the inner wall of the tank 1 and the sheath 11, the gas bubbles accelerate the rising of the liquid and promote the circulation of this liquid in the tank 1, thereby improving the efficiency.

Thus the liquid to be treated passes several times through the sheath 11 and therefore undergoes several oxygenation treatments.

The flow of the liquid 3 may be regulated by shifting the sleeves 22 and 23 relative to the ports 17 and 18.

The stirring of the liquid 3 by the propeller 20 and the static obstacles 32 or 32a causes foam to be formed on the surface of the liquid 3 in the tank 1.

The rotation of this propeller 20 inside the sheath 11 produces a pumping effect at the level of the surface of the liquid 3 in the funnel 14, a suction of the foam floating on the surface of the liquid and a drop in the level of the latter in the sheath 11.

The foam is consequently dragged into, drowned in and mixed with the liquid 3 in the tank 1 so that it is possible to progressively eliminate it.

The position of the sleeves 22 and 23 relative to the ports 17 and 18 regulates the flow of liquid and foam 5 sucked inside the sheath 11 by the propeller 20.

The choice of the main propeller 20 and the speed of rotation of the latter allows to adapt the consumption of energy to the liquid that has to be treated.

In the case where the device according to the invention does not include static elements 32 or 32a as shown in FIG. 1, turbulences are created naturally inside the sheath 11. But the efficiency is lower and the device is then only suitable for liquids which are slightly charged. The static obstacles 32 or 32a promote the stirring of the liquid by turbulence and this improves the efficiency of the device.

Figure 5:
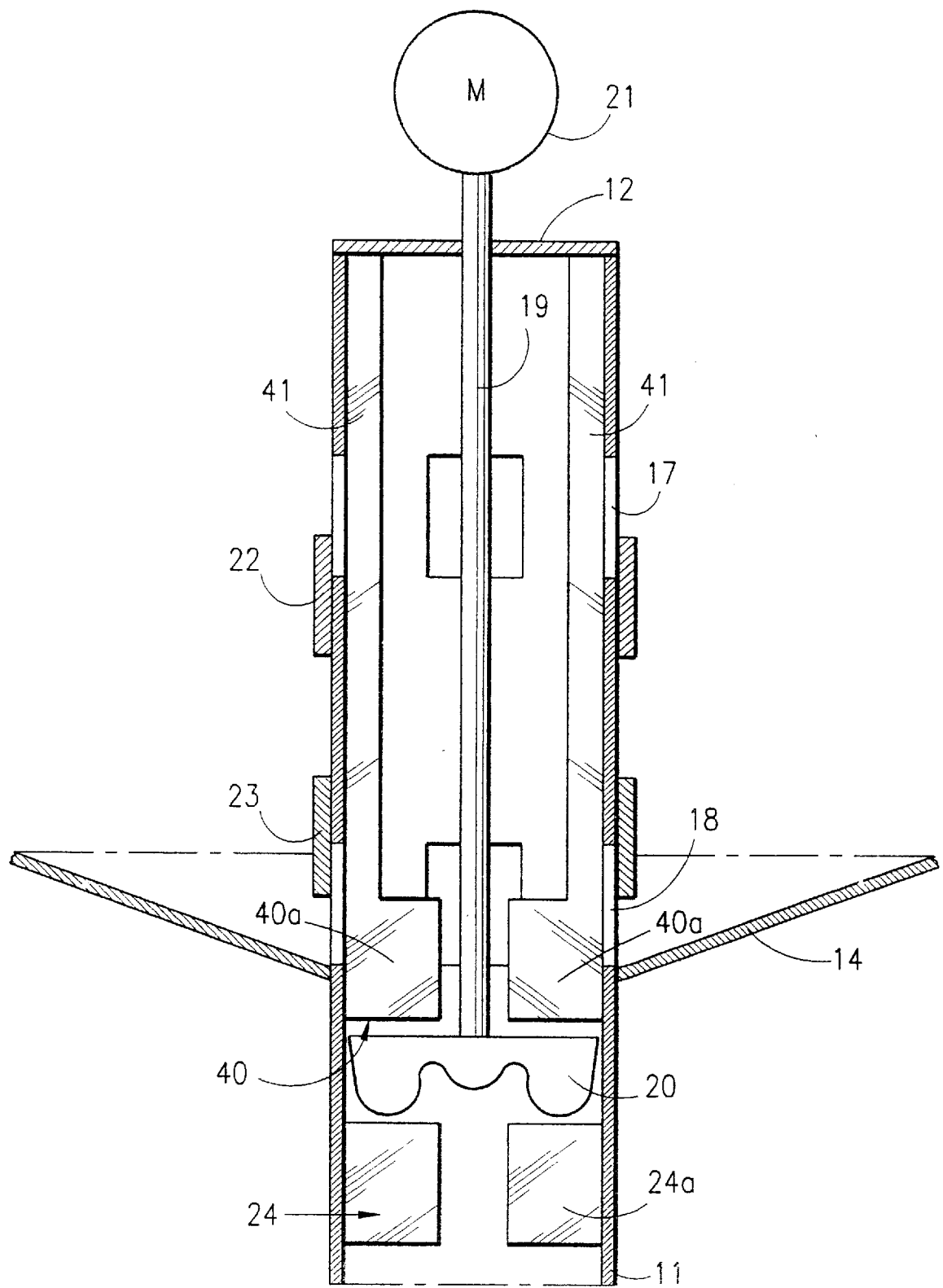
FIG. 5 is a diagrammatic partial sectional view of a third embodiment of a device for stirring and aerating the liquid according to the invention.

In a third embodiment shown in FIG. 5, the device comprises a second anti-vortex means 40 located inside the sheath 11 and above the main propeller 20.

This second anti-vortex means 40 comprises at least two vertical plates 40a each upwardly extended by a reinforcing rib 41 extending up to the upper end of the sheath 11.

Preferably, the second anti-vortex means 40 is formed by four vertical plates 40a evenly spaced apart inside the sheath 11 and each upwardly extended by a reinforcing rib 41.

Figure 6:
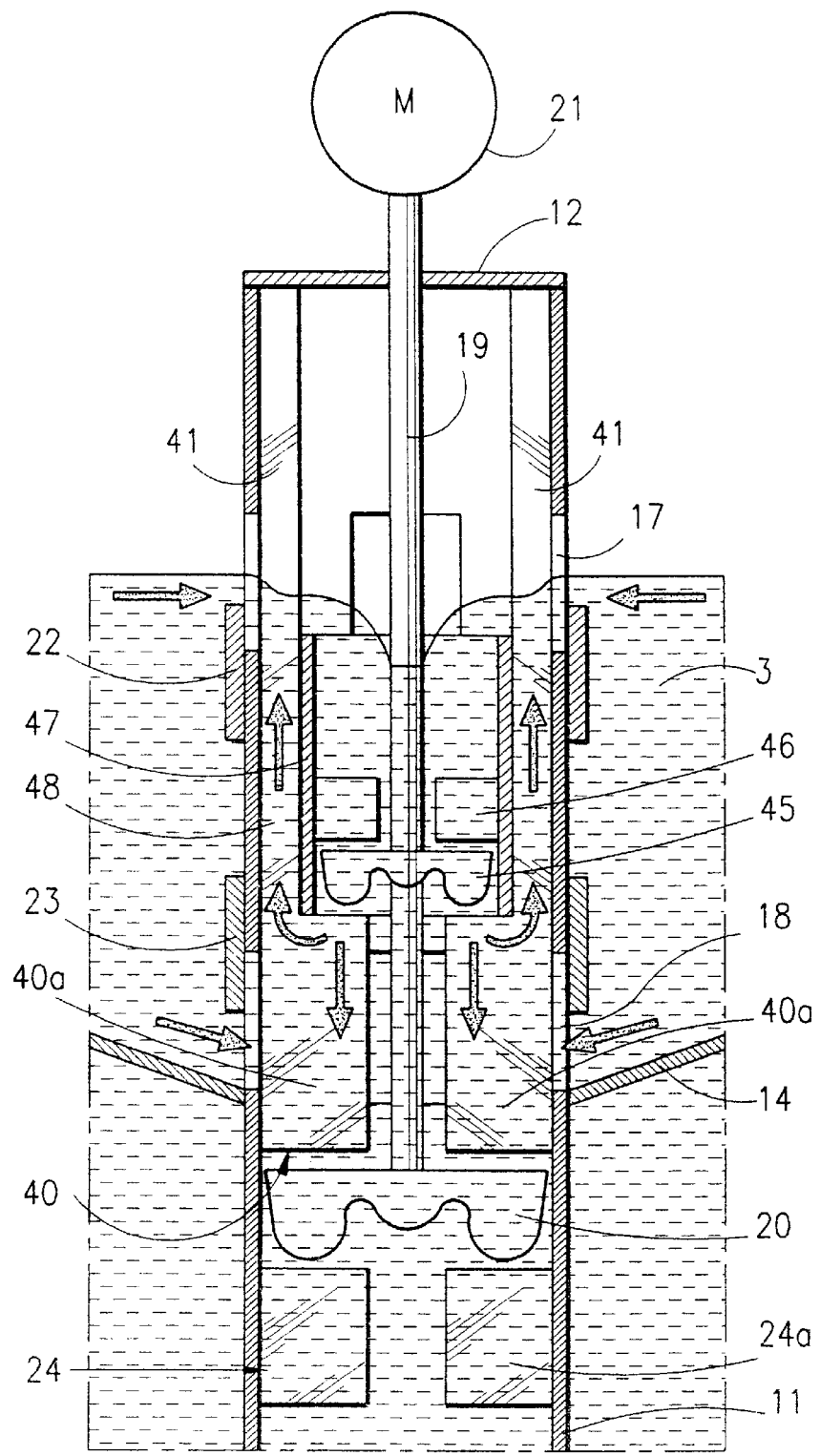
FIG. 6 is a diagrammatic sectional view of a liquid accelerator of the stirring and aerating device according to the invention.

In another embodiment shown in FIG. 6, the device comprises a liquid accelerator inside the sheath 11.

This liquid accelerator comprises a secondary propeller or screw 45 located above the second anti-vortex means 40 and fixed to rotate with the shaft 19.

The secondary propeller or screw 45 has a pitch oriented in the same direction as the pitch of the main propeller or screw 20.

Further, the liquid accelerator further comprises an anti-vortex means 46 located above the secondary propeller 45 and inside a cylindrical stack 47.

The stack 47 is fixed to the inner edge of the reinforcing ribs 41 so as to define with the sheath 11 and between the reinforcing ribs 41 passages 48 for the liquid.

The secondary propeller 45, the anti-vortex means 46 and the stack 47 are located between the two series of ports 17 and 18 which are provided, in this embodiment, with means for regulating the flow of the liquid 3 and the flow of the foam sucked inside the sheath 11.

The rotation of the main propeller 20 causes the suction of the liquid 3 located above funnel 14 into the sheath 11 through the ports 17 and 18 so that this liquid 3 continuously circulates downwardly in the sheath 11.

Further, owing to the rotation of the secondary propeller 45, the suction of the liquid 3 into the sheath 11 through the ports 17 and 18 is accelerated and a part of the liquid rises through the passages 48 provided between the sheath 11 and the stack 47 which still further accentuates this phenomenon of the acceleration of the liquid in the sheath 11.

In this case also, the regulation of the level of the liquid 3 in the sheath 11 is again achieved by the position of the sleeves 22 and 23 relative to the ports 17 and 18.

The anti-vortex means 46 prevents the rotation of the liquid in the stack 47.

This embodiment is especially suitable for products which have a particular tendency to foam.

Indeed, owing to the acceleration of the suction of the liquid 3 inside the stack 47 and the recirculation of a part of this liquid in the passages 48, the foam floating on the surface of the liquid 3 is sucked inside the stack 47.

Figure 7:
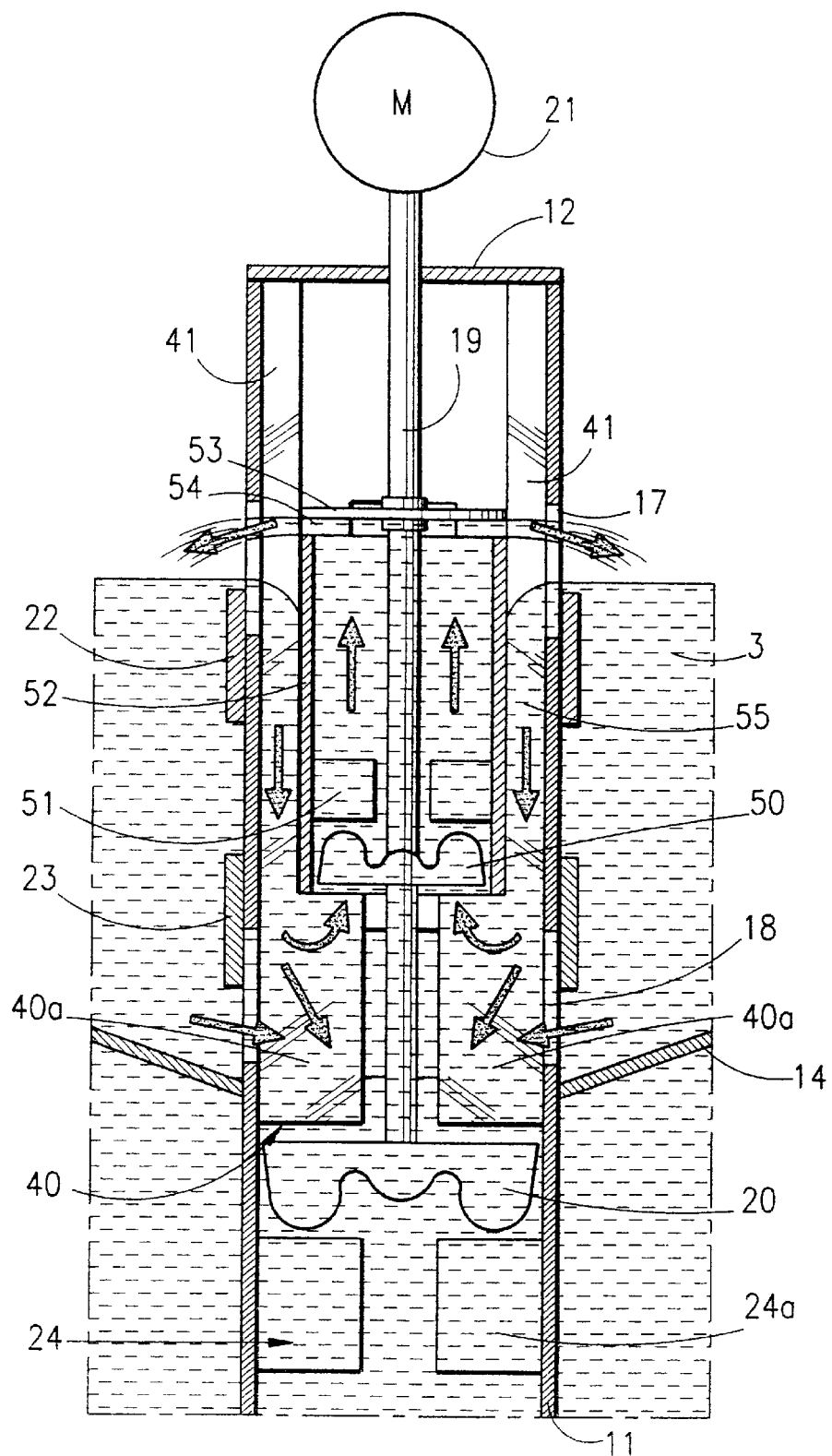
FIG. 7 is a diagrammatic sectional view of means for aerating the surface of the liquid.

In another embodiment shown in FIG. 7, the device comprises means for aerating the surface of the liquid 3 in the tank 1.

As shown in this FIG. 7, the means for aerating the surface of the liquid 3 located above funnel 14 are formed by a secondary propeller or screw 50 located above the second anti-vortex means and fixed to rotate with the shaft 19.

This secondary propeller 50 has a pitch which is inverted relative to the pitch of the main propeller 20.

The means for aerating the surface of the liquid 3 also comprise an antivortex means 51 located above the secondary propeller 50 and inside a cylindrical stack 52.

The stack 52 is fixed to the inner edges of the reinforcing ribs 48 so as to define with the sheath 11 and said reinforcing ribs 48 passages 55 for the liquid 3.

The secondary propeller 50 and the anti-vortex means 51 are located between the two series of ports 17 and 18 and the stack 52 extends substantially from the median part of the first series of ports 17 to the upper edge of the second series of ports 18.

A cover 53 is mounted on the shaft 19 above the upper edge of the stack 52.

The vertical position of the cover 53 is adjustable in order to define with the upper edge of the stack 52 an adjustable passage 54.

The rotation of the main propeller 20 sucks liquid 3 located above funnel 14 through the ports 17 and 18 so that this liquid circulates upwardly in the sheath 11.

Thus a part of the liquid 3 located above funnel 14 is sucked into the sheath 11 through the ports 18 and another part of the liquid is sucked through the ports 17 and circulates downwardly in the passages 55 defined between the stack 52 and the sheath 11.

Further, in view of the fact that the pitch of the secondary propeller 50 is inverted relative to the pitch of the main propeller 20, a part of the liquid is sucked into the stack 52 in the upward direction and sprayed into the air on the surface of the liquid 3 inside the funnel 14 in passing through the passage 54.

Thus the spraying of a part of the liquid allows to aerate the surface of the liquid 3 and consequently to reduce the formation of foam on this surface.

The anti-vortex means 51 prevents the rotation of the liquid in the stack 52 above the secondary propeller 50.

In this embodiment also, the flow of the liquid 3 in the sheath 11 may be regulated by shifting the sleeves 22 and 23 relative to the ports 17 and 18.

Figure 8:
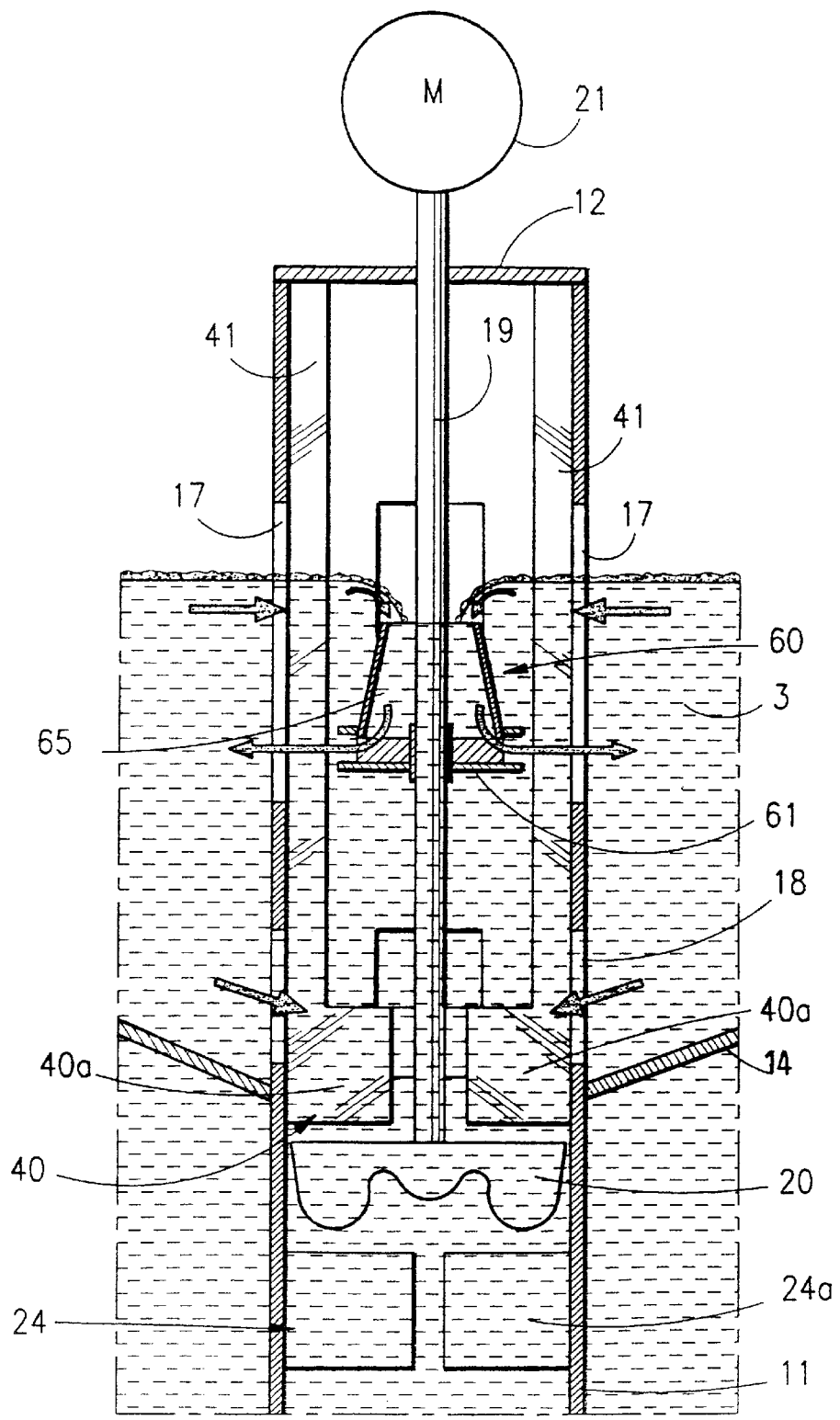
FIG. 8 is a diagrammatic partial sectional view of a fourth embodiment of a device for stirring and aerating the liquid according to the invention.
Figure 9:
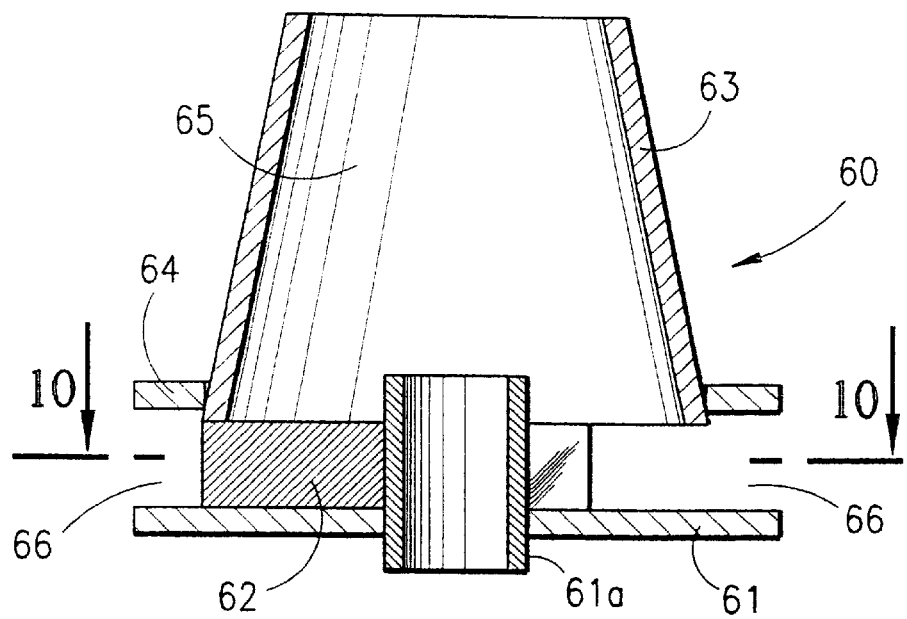
FIG. 9 is a diagrammatic view to a larger scale of the vortex pump of the fourth embodiment of the device according to the invention.
Figure 10:
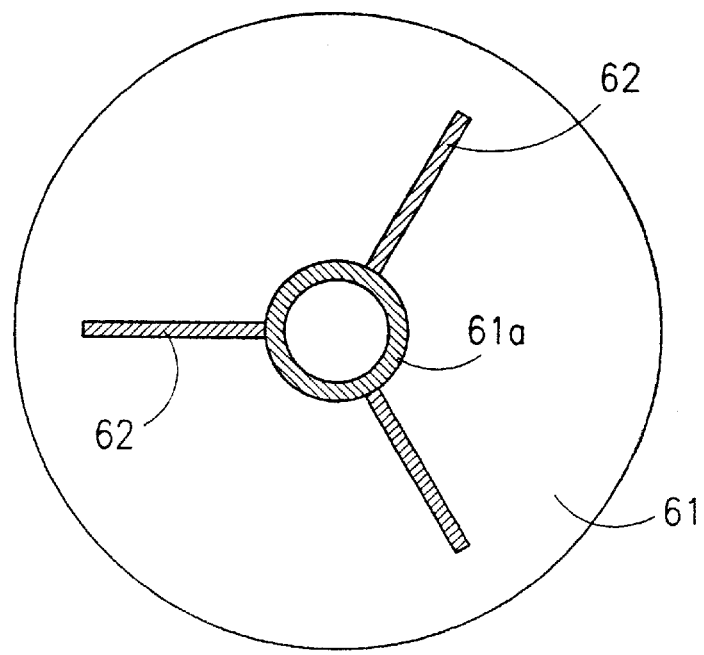
FIG. 10 is a sectional view taken on line 10—10 of FIG. 9.

In an embodiment shown in FIGS. 8 to 10, the device comprises a vortex pump 60 for the suction of the surface of the liquid 3 located above funnel 14 into the sheath 11.

This vortex pump 60 is located above the second anti-vortex means 40 and at the level of the first series of ports 17.

This vortex pump 60 is driven in rotation by the shaft 19 and comprises, on one hand, a circular plate 61 fixed to the shaft 19 and provided on its upper side with radial and vertical blades 62 and, on the other hand, a stack 63 fixed to the upper edge of the blades 62.

The assembly comprising the plate 61, the blades 62 and the stack 63 is maintained on the shaft 19 by means of a sleeve 61a which position on the shaft 19 is adjustable.

The sleeve 61a is fixed to the shaft 19 by means formed for example by a fixing screw (not shown).

As shown in FIGS. 8 and 9 the upper edge of the blades 62 is provided with a ring 64 extending outwardly of the stack 63.

This stack 63 extends from a position adjacent the top of the tank 1 substantially from the median part of the first series of ports 17 to the upper edge of the blades 62.

The stack 63 defines an inner passage 65 which communicates in its lower part with the interior of the sheath 11 through annular passages 66 formed between the blades 62 and between the ring 64 and the plate 61.

Preferably, the stack 63 is conical and tapers toward the upper part of the tank 1 as shown in FIG. 9.

In a variant, the stack 63 may be cylindrical.

The blades 62 are planar or curved and preferably three in number angularly evenly spaced apart on the plate 61 as shown in FIG. 10.

The rotation of the main propeller 20 causes a suction of the liquid 3 located above funnel 14 into the sheath 11 through the ports 17 and 18 so that this liquid 3 continuously circulates downwardly in this sheath.

Further, the rotation of the vortex pump 60 driven by the shaft 19, i.e. the rotation of the assembly comprising the plate 61, the blades 62 and the stack 63, causes a suction of the surface of the liquid 3 into the passage 65 so that this liquid thereafter passes through the annular passages 66 and is reinjected into the tank 1.

In this embodiment, the regulation of the flow of the liquid by means of the sleeves 22 and 23 inside the sheath 11 is unnecessary.

This embodiment is particularly suitable for products having a great tendency to foam owing to the fact that the foam floating on the surface of the liquid 3 is sucked by the vortex pump 60 so that this foam can be rapidly and effectively eliminated.

Figure 11:
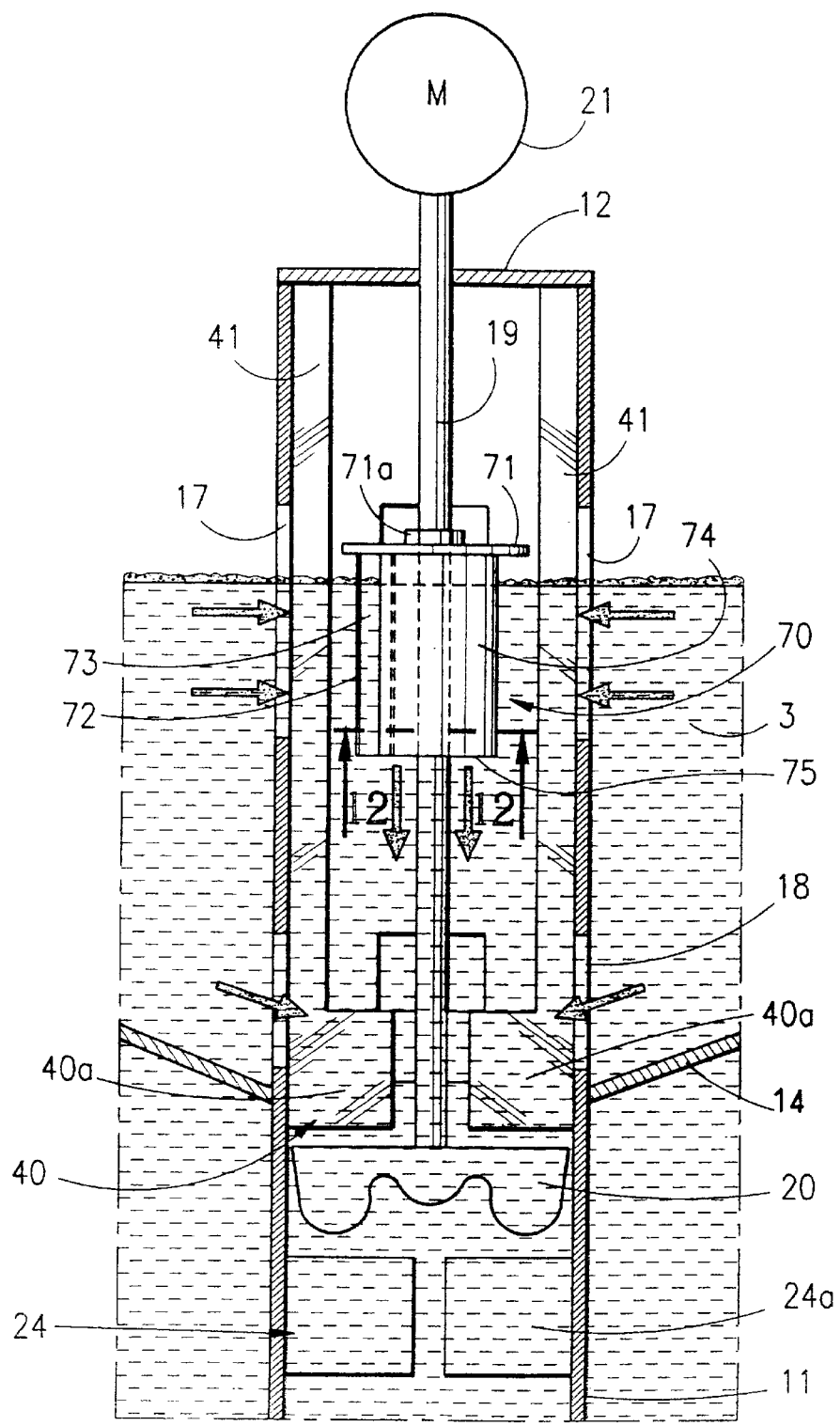
FIG. 11 is a diagrammatic partial sectional view of a fifth embodiment of a device for stirring and aerating the liquid according to the invention.
Figure 12:
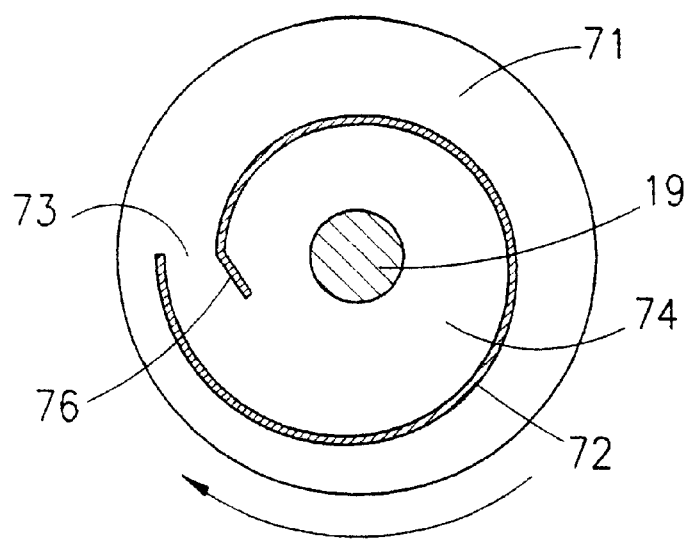
FIG. 12 is a sectional view taken on line 12—12 of FIG. 11.

In an embodiment shown in FIGS. 11 and 12, the device comprises a single-passage propeller 70 for sucking the liquid 3 located above funnel 14 into the sheath 11.

This single-passage propeller 70 is located above the second anti-vortex means 40 and at the level of the first series of ports 17.

The single-passage propeller 70 is driven in rotation by the shaft 19 and comprises, on one hand, a circular plate 71 fixed to the shaft 19 and located above the level of the liquid 3 in the tank 1 and, on the other hand, in the liquid 3, a vertical plate 72 forming a spiral and fixed to the lower face of the plate 71 around the shaft 19.

As shown more particularly in FIG. 12, the plate 72 defines a lateral inlet 73 for the liquid which extends throughout the height of the plate 72, a vertical passage 74 for the downward circulation of this liquid and a lower outlet 75 for the liquid.

The assembly comprising the plate 71 and the vertical plate 72 is maintained on the shaft 19 by means of a sleeve 71a whose vertical position on the shaft 19 is adjustable.

For this purpose, the sleeve 71a is fixed to the shaft 19 by means formed for example by a fixing screw (not shown).

The inner edge of the vertical plate 72 includes a vertical deflector 76 inclined in the direction toward the center of the spiral formed by the plate 72.

Further, the distance between the plate 72 and the axis of the shaft 19 progressively decreases as shown in FIG. 12.

The rotation of the single-passage propeller 70 driven by the shaft 19, i.e. the rotation of the assembly comprising the plate 71 and the plate 72, in the direction indicated by the arrow in FIG. 12, causes the suction of the liquid 3 located above the funnel 14 into the interior of the plate 72 through the lateral inlet 73.

This liquid is stirred inside the vertical passage 74, circulates downwardly in the latter and is discharged into the sheath through the lower outlet 75.

The deflector 76 improves the stirring of the liquid in the vertical passage 74 and prevents a return of the liquid through the lateral inlet 73.

Figure 14:
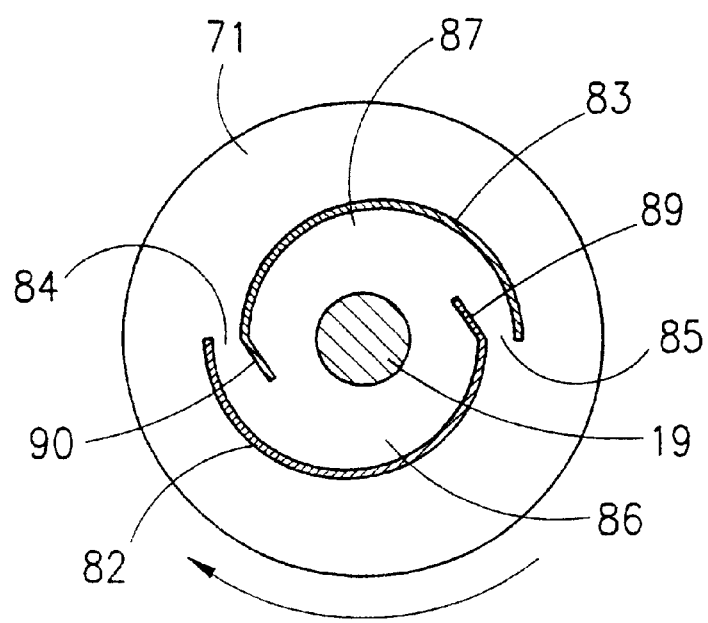
FIG. 14 is a sectional view taken on line 14—14 of FIG. 13.
Figure 13:
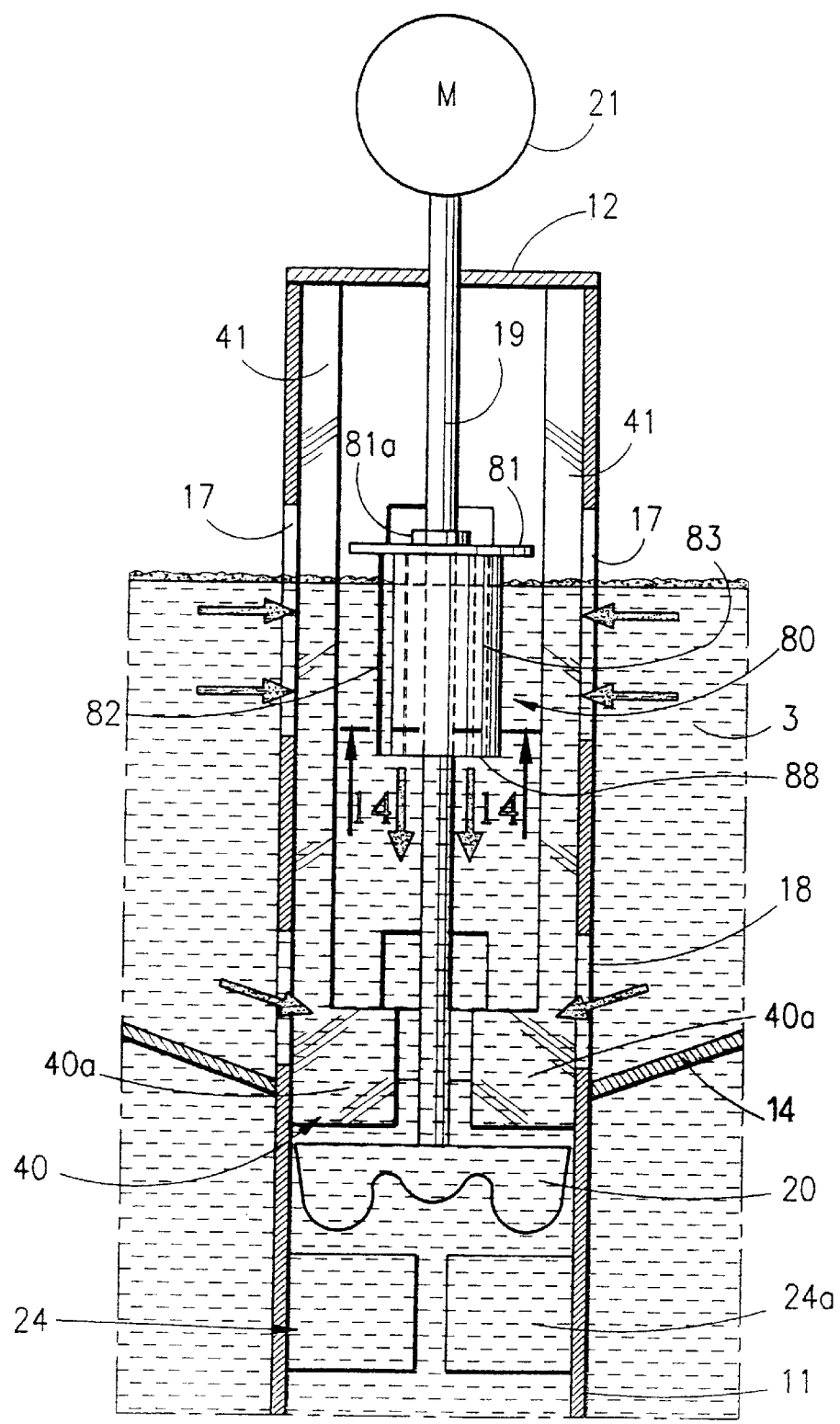
FIG. 13 is a diagrammatic partial sectional view of a sixth embodiment of a device for stirring and aerating the liquid according to the invention.

In a last embodiment shown in FIGS. 13 and 14, the device comprises a double-passage propeller 80 for the suction of the liquid 3 located above funnel 14 into the sheath 11.

This double-passage propeller 80 is located above the second anti-vortex means 40 and at the level of the first series of ports 17.

The double-passage propeller 80 is driven in rotation by the shaft 19 and comprises, on one hand, a circular plate 81 fixed to the shaft 19 and located above the level of the liquid 3 in the tank 1 and, on the other hand, in the liquid 3, two vertical plates 82 and 83.

The vertical plates 82 and 83 are fixed to the lower face of the plate 80 and each have the shape of two half-shells which are in opposed and offset relation to each other as shown in FIG. 14.

The two plates 82 and 83 define two lateral inlets 84 and 85 for the liquid, two passages 86 and 87 for the downward circulation of the liquid and a lower outlet 88 for the liquid.

The assembly comprising the plate 81 and the vertical plates 82 and 83 is maintained on the shaft 19 by means of a sleeve 81 a whose vertical position on the shaft 19 is adjustable.

The sleeve 81 is fixed to the shaft 19 by means consisting for example of a fixing screw (not shown).

As shown more particularly in FIG. 14, the edge of each plate 82 and 83 facing toward the passage 86 or 87 defined by the other plate comprises a vertical deflector respectively 89 and 90.

The rotation of the double-passage propeller 80 driven, by the shaft 19, i.e. the rotation of the assembly comprising the plate 81 and the two vertical plates 82 and 83 in the direction indicated by the arrow in FIG. 14, causes the suction of the liquid 3 located above funnel 14 through the ports 17.

This liquid enters through the lateral inlet 84 and 85, is stirred inside the passages 86 and 87 and circulates downwardly in these passages 86 and 87 and is thereafter discharged into the sheath 11 through the lower outlet 88.

The deflectors 89 and 90 increase the stirring of the liquid in the passages 86 and 87 and prevent the liquid from flowing back through the lateral inlets 84 and 85.

In these last two embodiments, the regulation of the flow of liquid by means of the sleeves 22 and 23 of the sheath 11 is unnecessary and these last two embodiments are more particularly employed in the case where the level of the liquid in the tank 1 is variable.

To improve the flow of the liquid of the single-passage propeller 70 or the double-passage propeller 80, a pumping propeller (not shown) may be arranged on the shaft 19 below the single-passage propeller or below the double-passage propeller.

The device according to the invention may be applied for example to the treatment of water, town effluents, industrial waste waters, fats by biodecomposition, drainage substances, cattle-raising waste products and generally any biodegradable industrial products.

The device according to the invention may also be employed for example in the ozonization of water by an ozonized gas with or without a catalyst, in the stabilization of sludges, or may be employed in a thermophile treatment or for liquids charged with substances in suspension for example organic or mineral substances.

The device according to the invention may also be employed as a reactor operating with a fluidized or moving bed.

As mentioned before, the device according to the invention has the advantage of being suitable for deep treating tanks, of consuming little energy, of requiring little maintenance, and of eliminating the foam floating on the surface of the liquid in the treating tank, thereby ensuring that this foam does not pollute the environment.

What is claimed is:

1. Device for stirring and aerating a liquid and eliminating the foam in a tank for treating said liquid, comprising inside said tank:
    a vertical sheath extending in a part of the height of said tank and comprising, in its upper part, at least a first opening providing an entry passage for said liquid and, near the bottom of said tank, at least a second opening providing an exit passage for said liquid,
    a funnel located around the upper part of said sheath and connected to said sheath, the upper edge of said funnel defining with a wall of said tank a free space for the passage of said liquid,
    a main propeller located inside said sheath below the bottom of said funnel,
    a vertical shaft driven in rotation, extending inside said sheath above said propeller and driving the latter in rotation,
    an anti-vortex means located inside said sheath, below said propeller,
    means for injecting a gas under pressure in said sheath, below said anti-vortex means, and
    uniquely static stirring means for stirring said liquid by turbulence inside said sheath, said static stirring means being located below said antivortex means.

2. Device according to claim 1, comprising means for eliminating foam in said tank, including:
    a first series of ports provided in the upper part of said sheath and located at the level of said liquid in said funnel,
    a second series of ports provided in said sheath, above said bottom of said funnel, and
    means for regulating the level of said liquid in said funnel.

3. Device according to claim 2, comprising means for regulating the flow of said liquid and of said foam sucked by said propeller into said sheath.

4. Device according to claim 3, wherein said means for regulating the flow of said liquid and of said foam sucked in by said propeller comprise, on one hand, a first sleeve located around said sheath at the level of said first series of ports and, on the other hand, a second sleeve located around said sheath at the level of said second series of ports, the position of said sleeves relative to the corresponding ports being vertically adjustable.

5. Device according to claim 1, wherein said uniquely static stirring means comprise the inner wall of said sheath.

6. Device according to claim 1, wherein said uniquely static stirring means comprise superimposed static obstacles located inside said sheath.

7. Device according to claim 6, wherein said static obstacles are evenly spaced apart throughout at least a portion of said sheath located below said anti-vortex means.

8. Device according to claim 6, wherein said static obstacles are arranged in said sheath, on one hand, below said anti-vortex means and, on the other hand, in the lower part of said sheath.

9. Device according to claim 6, wherein said static obstacles are formed by cups the concavity of which faces toward said bottom of said tank.

10. Device according to claim 6, wherein said static obstacles are formed by discs.

11. Device according to claim 6, wherein said uniquely static stirring means comprise, on one hand, said superimposed static obstacles and, on the other hand, a vertical tube located inside said sheath and extending from said bottom of said tank to below said anti-vortex means, said static obstacles being fixed to said tube.

12. Device according to claim 11, wherein said static obstacles define with said inner wall of said sheath passages for the circulation of said liquid.

13. Device according to claim 6, wherein said static obstacles are fixed to the inner wall of said sheath and define an axial passage for the circulation of said liquid.

14. Device according to claim 1, wherein said tank is insulated.

15. Device according to claim 2, wherein said means for regulating the level of said liquid in said funnel comprise an overflow pipe located inside said funnel in a position which is vertically adjustable.

16. Device according to claim 2, comprising a second anti-vortex means located inside said sheath and above said main propeller, said second anti-vortex means including at least two vertical plates each extended upwardly by a stiffening rib extending up to the upper end of said sheath.

17. Device according to claim 1, comprising a liquid accelerator inside said sheath.

18. Device according to claim 16, comprising a liquid accelerator in said sheath, said liquid accelerator including, on one hand, a secondary propeller located above said second anti-vortex means, connected to rotate with said shaft, and having a pitch oriented in the same direction as the pitch of said main propeller and, on the other hand, a third anti-vortex means located above said secondary propeller and inside a cylindrical stack fixed to said stiffening ribs, said secondary propeller, said third anti-vortex means and said stack being located between said two series of ports.

19. Device according to claim 16, comprising means for aerating the surface of said liquid in said tank.

20. Device according to claim 19, wherein said means for aerating the surface of said liquid comprise, on one hand, a secondary propeller located above said second anti-vortex means, connected to rotate with said shaft and having a pitch inverted relative to the pitch of said main propeller and, on the other hand, a third anti-vortex means located above said secondary propeller and inside a cylindrical stack fixed to said stiffening ribs, said secondary propeller and said third anti-vortex means being located between said two series of ports and said stack extending substantially from the median part of said first series of ports to the upper edge of said second series of ports.

21. Device according to claim 20, wherein a cover is mounted on said shaft above the upper edge of said stack and defines with said upper edge an adjustable passage.

22. Device according to claim 16, comprising a vortex pump for the suction of the surface of said liquid into said sheath, located above said second anti-vortex means and at the level of said first series of ports.

23. Device according to claim 22, wherein said vortex pump comprises, on one hand, a circular plate connected to rotate with said shaft and provided on its upper side with radial and vertical blades and, on the other hand, a stack fixed to the upper edge of said blades and extending from a position adjacent the upper end of said tank substantially from the median part of said first series of ports to said upper edge of said blades.

24. Device according to claim 23, wherein said stack is conical and tapers toward the upper part of said tank.

25. Device according to claim 23, wherein said stack is cylindrical.

26. Device according to claim 23, wherein said blades are planar or curved.

27. Device according to claim 16, comprising a single-passage propeller for the suction of said liquid into said sheath, located above said second anti-vortex means and at the level of said first series of ports.

28. Device according to claim 27, wherein said single-passage propeller comprises, on one hand, a circular plate connected to rotate with said shaft and located above the level of said liquid in said tank and, on the other hand, in said liquid, a vertical plate forming a spiral and fixed to the lower face of said plate around said shaft, said plate defining a lateral inlet for said liquid, a vertical passage for the downward circulation of said liquid and a lower outlet for said liquid.

29. Device according to claim 28, wherein the inner edge of said vertical plate comprises a vertical deflector which is inclined in the direction toward the center of said spiral.

30. Device according to claim 16, comprising a double-passage propeller for the suction of said liquid into said sheath, located above said second anti-vortex means and at the level of said first series of ports.

31. Device according to claim 30, wherein said double-passage propeller comprises, on one hand, a circular plate connected to rotate with said shaft and located above the level of said liquid in said tank and, on the other hand, in said liquid, two vertical plates fixed to the lower face of said plate and having the shape of two half-shells which are in opposed and offset relation to each other, said plates defining two lateral inlets for said liquid, two vertical passages for the downward circulation of said liquid and a lower outlet for said liquid.

32. Device according to claim 31, wherein the edge of each said plate located in facing relation to said passage defined by said other plate includes a vertical deflector.

33. Device according to claim 27, wherein a pumping propeller is fixed on said shaft below said single passage propeller.

34. Device according to claim 30, wherein a pumping propeller is fixed on said shaft below said double-passage propeller.

* * * * *